United States Patent [19]

Fletcher et al.

[11] 3,832,903
[45] Sept. 3, 1974

[54] STAGNATION PRESSURE PROBE

[76] Inventors: James C. Fletcher, Administrator of the National Aeronautics and Space Administration with respect to an invention of; Michael J. Goodyer, 8 Bassett Green Rd., Southampton, England

[22] Filed: Sept. 7, 1972

[21] Appl. No.: 287,149

[52] U.S. Cl. .................................. 73/388, 73/182
[51] Int. Cl. ............................................. G01l 7/00
[58] Field of Search .................... 73/182, 212, 388; 137/15.1, 15.2

[56] References Cited
UNITED STATES PATENTS 2,997,843   8/1961   Arnett et al. ...................... 137/15.2
3,618,388   11/1971   Rose ..................................... 73/182

Primary Examiner—Donald O. Woodiel
Attorney, Agent, or Firm—Howard S. Osborn; John R. Manning

[57] ABSTRACT

A method and apparatus for measuring the stagnation pressure of supersonic velocity gas streams without the generation of shock waves which interfere with such measurements. The technique is insensitive to type of gas and Mach number and is therefore particularly useful in the study of jet engine exhausts.

15 Claims, 4 Drawing Figures

PATENTED SEP 3 1974  3,832,903

STAGNATION PRESSURE PROBE

ORIGIN OF THE INVENTION

The invention described herein was made in the performance of work under a NASA contract and is subject to the provisions of Section 305 of the National Aeronautics and Space Act of 1958, Public Law 85-568 (72 STAT. 435; 42 USC 2457).

BACKGROUND OF THE INVENTION

This invention relates generally to measurements of gas streams of supersonic velocity and more specifically to the measurement of the stagnation pressure of such a gas stream.

The measurement of stagnation pressure is a requirement of investigations in aeronautics. Knowledge of this parameter is required in testing of both aerodynamic surfaces and engines. Stagnation pressure is essentially the static pressure resulting when the flow of a gas stream is brought to rest isentropically. It varies with the kind of gas, the Mach number and the static pressure. The phrase total pressure is sometimes used in the same sense as stagnation pressure and the term recovered pressure meets the same requirements in an ideal system where there are no losses in the conversion of the kinetic energy of the moving gas to the pressure energy of the gas at rest.

Heretofore the only available means of evaluating stagnation pressure has been the use of pitot tubes and similar devices to secure a measurement of pressure which is adjusted by factors previously studied to arrive at a value for stagnation pressure. In gas streams flowing at supersonic velocities, however, the shock waves which accompany the pitot tube and any other surface, including the surface being investigated, drastically affect the reading of such a pitot tube. Moreover, the effect of the shock waves varies with the type of gas and the Mach number so that in certain situations, such as the study of a jet engine exhaust, irregular variations of gas and Mach number make computation of the adjustment factors haphazard. The dependability of the stagnation pressure computation suffers accordingly. Moreover, in some investigations the stagnation pressure measurement is required to compute the Mach number of the gas. In such a case one of the prime factors used to adjust a pitot tube reading, the Mach number is the very unknown being studied leaving the investigator heavily dependent on theoretical computations rather than actual measured parameters.

SUMMARY OF THE INVENTION

It is the primary purpose of this invention to provide a means for the direct measurement of stagnation pressure of a supersonic gas stream. This direct technique is independent of adjustment factors which may vary with the conditions under which the measurements are taken. It is accomplished by isentropically decelerating a part of the gas stream and reading the pressure of that portion with conventional devices such as pitot tubes. The deceleration and compression of the gas stream is caused by a curved surface placed in the gas stream. This surface is placed with its leading edge approximately parallel to the direction of flow of the gas and it consists of a gradual curve into the flow such that it does not generate a shock wave sufficient to interfere with a measurement taken at its downstream end. A pitot tube or other pressure measuring device is mounted so that it is near the downstream end of the curved surface, but it is placed far enough off the surface to be clear of any boundary layer which could interfere with the measurement. The supersonic air stream is thus decelerated and compressed isentropically by the curved surface and the pitot tube measures the pressure without any shock wave interfering with the technique. This enables investigators to take direct measurements of stagnation pressure in such situations as across the path of a jet engine exhaust where the type of gas and the velocity are continuously changing. No further calibration factors are then required and no previous knowledge of the type of gas or Mach number is required. The resulting measurements may, in fact, be used to compute the Mach number of the gas stream.

Although the greatest benefit from the invention is in the study of supersonic gas streams, it is not limited to that velocity range. The invention is also convenient to use and accurate in both the sonic and subsonic range.

A secondary function of the invention is served by pressure monitoring orifices positioned along the deflecting surface. The pressures from these orifices are used to operate instruments which indicate the orientation of the surface in the gas stream. The relative pressures of such orifices alined along axes parallel and perpendicular to the gas stream are sensed and changes in these pressures are used as aids in maintaining the orientation of the surface in the gas stream. Such a system can also be used to determine the orientation of supersonic aircraft flying in atmosphere.

DETAILED DESCRIPTION OF THE INVENTION

Figure 1:
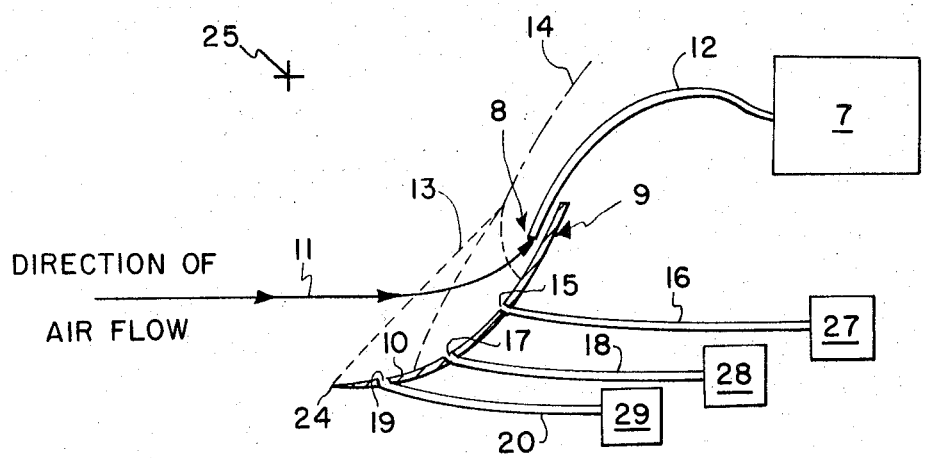
FIG. 1 is a cross section view of the invention in the plane described by the gas stream which it deflects, showing only the leading edge of the surface.
Figure 2:
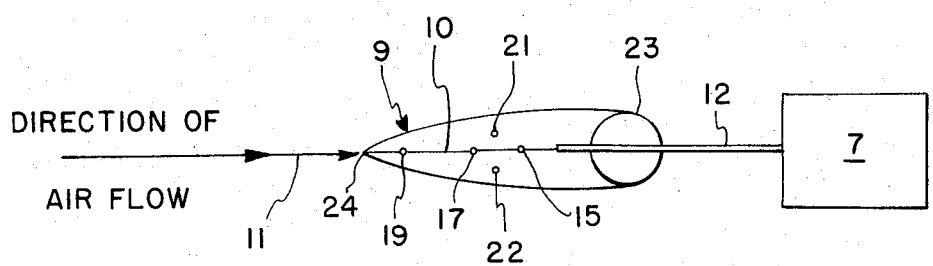
FIG. 2 is a top plan view of the invention.
Figure 3:
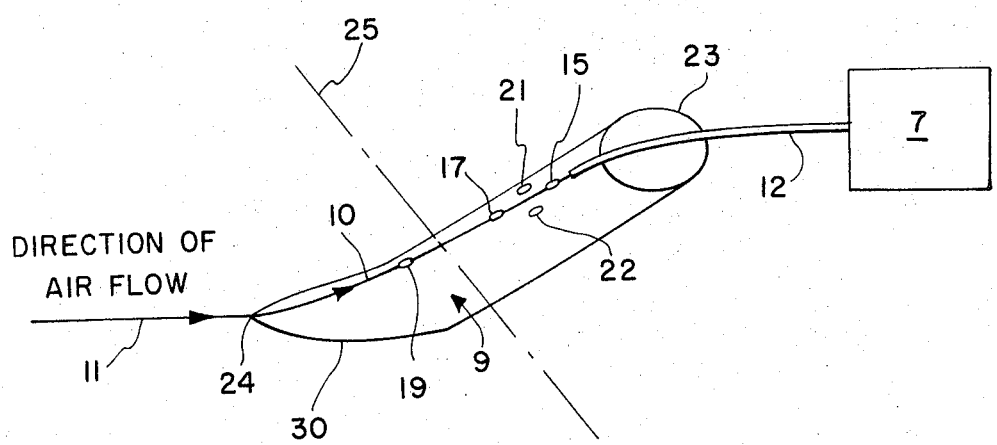
FIG. 3 is a perspective view of the invention.

The specific embodiment of the invention selected for illustration is shown in simplified cross section form in FIG. 1 which shows the cross section of the leading edge 10 of the stagnation pressure probe. Leading edge 10 is that line of the surface 9 which first meets the gas stream. FIGS. 2 and 3 show other views of the same configuration. The same numbers indicate the same parts in all views. FIG. 2 is a top plan view and FIG. 3 is a perspective view of the invention. The curve of the leading edge 10 as seen in FIG. 1 is a smooth curve about an axis 25 perpendicular to the axis of the flow of the supersonic gas. A typical flowline 11 of the sampled part of the supersonic gas stream is shown being deflected toward pitot tube 12 by deflecting surface 9. The supersonic gas stream impinging on deflecting surface 9 forms a compression fan 13 ahead of the leading edge 10 of the deflecting surface 9. This compression fan 13 merges into shock wave 14 and down stream from the shock wave lies an area 8 of lower velocity compressed gas undisturbed by the shock wave 14. In this undisturbed area is placed a conventional pitot tube 12 which transmits the static pressure of the gas immediately adjacent to its upstream end to a pressure measuring device 7. Pitot tube 12 is placed at the down stream end of the leading edge 10 sufficiently far from the surface 9 to be unaffected by the boundary layer flowing along the surface. Since the gas stream in area 8 has been decelerated to the near sonic range, any shock wave generated in this area immediately upstream from the pitot tube 12 is of minor nature and does not interfere with the desired pressure measurement.

The shape of surface 9 in the direction transverse to the gas flow can have many variations. It may be a circular cross section as shown in FIG. 3 at top edge 23, an ellipse, or a simple rectangular sheet with no significant depth dimension. The circular and elliptical surfaces may be open or close upon themselves and be either solid or hollow. A critical aspect of the surface is that the width in the direction transverse to the gas flow is limited so as to limit the growth of the boundary layer. The surface 9 must be narrow enough to allow the boundary layer to spill off the edges of the surface thus relieving the boundary layer and preventing separation of the layer of creation of a disturbance upstream from the pitot tube. The forward tip 24 of the deflecting surface 9 is tapered to minimize the shock wave in both its width as seen in FIG. 3 and in the surface thickness as seen in FIG. 1.

The deflecting surface 9 of the stagnation pressure probe contains two patterns of pressure orifices which allow verification and correction, if required, of the orientation of the probe within the gas stream. Pressure orifices 15, 17 and 19 form a line parallel to the typical flowline 11 of the gas. Accuracy of the probe is enhanced by alining the leading edge 10 of deflecting surface 9 as it approaches tip 24 into a parallel relationship with the axis of gas flow. While the probe is tolerant of misalinement up to the order of 10°, the ratios of the pressures indicated at pressure orifices 15, 17 and 19 are used to perfect this alinement. The pressures along the surface 9 at the orifices 15, 17 and 19 are read by pressure measuring devices 27, 28 and 29 attached by tubes 16, 18 and 20, respectively. The ratios of these pressure readings are used to indicate the relative position of the probe and changes in these ratios indicate deviations from the original orientation of the probe in the plane of deflection of the gas stream. In a similar manner the pressure orifices 21 and 22 are used to indicate the orientation of deflecting surface 9 relative to the planes transverse to the axis of flow of the gas.

The preferred embodiment of the stagnation pressure probe described above consists of a cylindrical member of .372 inch diameter cross section at the top edge 23. The member is curved about an axis 25 such that leading edge 10 nearest the axis has a 2¼ inch radius of curvature for an angular sweep of 55°. The curve at the forward tip 24 of the surface 9 is placed approximately parallel to the direction of gas flow and the cross section 30 formed by cutting the cylinder at forward tip 24 forms a 7° angle with the tangent of leading edge 10. A .02 inch inside diameter, .04 inch outside diameter pitot tube 12 protrudes .27 inch into the area of deflecting surface 9 described by the 55° angle at the downstream end of the deflecting surface. The pitot tube 12 is mounted flush against leading edge 10 since the boundary layer effect in this region is less than the wall thickness of the pitot tube. The pressure orifices 15, 17, 19, 21 and 22 in deflecting surface 9 are .02 inch diameter holes drilled flush with the surface. This embodiment of the stagnation pressure probe demonstrates a true reading of stagnation pressure within 1 percent error in gas stream velocities in the supersonic range and down to subsonic velocities.

Figure 4:
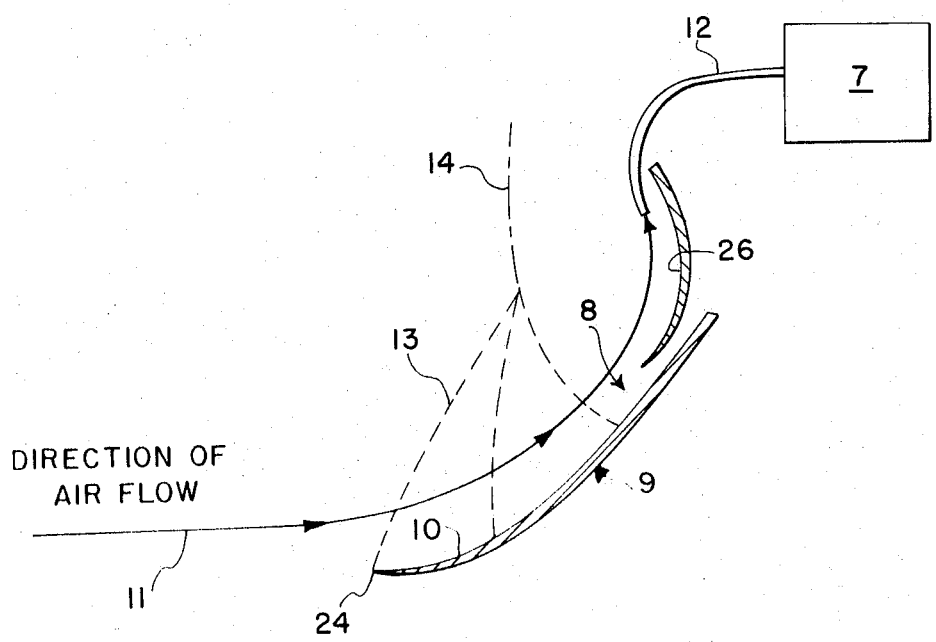
FIG. 4 is a cross section view of two deflecting surfaces placed in series in a gas stream showing only the leading edges of the surfaces.

While the embodiment described above yields excellent results in the supersonic range other embodiments are used to measure stagnation pressures in higher velocity gas streams. These variations consist of a plurality of deflecting surfaces placed in series progressing downstream. FIG. 4 shows one of these variations with only two deflecting surfaces. Leading edge 10 here is similar to that described in the embodiment using one surface. Leading edge 26 is similar to, but smaller than, edge 10 and is placed in the position 8 comparable to the pitot tube of the previously described embodiment where neither the shock wave nor the boundary layer affect the measurement. At this position at the downstream end of the first deflection surface the typical flowline 11 of the gas stream which has been deflected by the first surface is picked up by the smaller deflection surface which then deflects flowline 11 to pitot tube 12. Pitot tube 12 is oriented toward the second deflecting surface in the same manner as the pitot tube is positioned in a single stage embodiment shown in FIG. 1. Each surface in the multistage technique contributes to the deceleration and compression of the sampled part of the gas stream so that in total the velocity is decreased more than in the single stage arrangement. This is accomplished without breaking up the boundary layer since the smaller second deflecting surface allows the spill-off described above to relieve the boundary layer growth.

It is to be understood that the forms of the invention herein described are to be taken as preferred embodiments. Various changes may be made in the shape, size and arrangements of parts. For instance, the deflecting surface may be flat or cylindrical, may have other smooth configurations or may be tapered in any of its dimensions. Also, the number, length and position of the deflecting surfaces may be varied with the velocity of the air stream studied. The embodiment described includes five pressure orifices in a particular pattern of straight lines. However, a nonlinear configuration of pressure orifices or a greater or lesser number of holes could be used without departing from the invention.

What is claimed as new and desired to be secured by Letters Patent of the United States is:

1. A method of directly measuring stagnation pressure of a gas stream having an upstream, downstream and boundary layer of supersonic, subsonic, or sonic velocity by decelerating said gas stream comprising the steps of:

directing the gas stream in a manner whereby a nearly isentropic deceleration and compression results, thereby rendering the gas stream incapable of forming an interference shock wave; and placing a pressure measuring means in the decelerated part of said gas stream, clear of any adverse boundary layer and shock wave effects; and directly measuring the stagnation pressure.

2. A method of directly measuring stagnation pressure of a gas stream according to claim 1 wherein said method includes the further step of:

deflecting said gas stream by means of a deflecting surface means to decelerate and compress said gas stream to nearly sonic velocity thereby rendering said gas stream incapable of forming an interfering shock wave; locating said pressure measuring means near the downstream portion of said deflecting surface means outside the boundary layer.

3. A method of directly measuring stagnation pressure of a gas stream according to claim 1 wherein said method includes the further step of:

placing a plurality of deflecting surface means in a series arrangement progressing downstream whereby each deflecting surface means contributes to the deceleration and compression of the air stream thereby rendering said gas stream incapable of forming an interfering shock wave; whereby said pressure measuring means is placed near the downstream portion of the last deflecting surface means in the series and outside of the boundary layer.

4. An apparatus for directly measuring stagnation pressure of a gas stream having an upstream, downstream and boundary layer of supersonic, subsonic or sonic velocity by decelerating said gas stream with a deflecting surface comprising:

deflecting surface means to deflect part of said gas stream from its original direction of flow to a direction angularly displaced from the direction of the balance of the gas stream thereby compressing and decelerating said part of the gas stream to near-sonic velocity rendering said gas stream incapable of forming an interfering shock wave; and pressure-measuring means located within said decelerated part of the gas stream near the downstream end of said deflecting surface means and clear of the boundary layer on said surface, and below any interfering shock wave, said pressure-measuring means directly measuring stagnation pressure.

5. An apparatus for directly measuring stagnation pressure of a gas stream according to claim 4 wherein said deflecting surface means begins approximately parallel to the axis of flow of the gas stream and describes a smooth curve such that said surface is bent into said gas stream thus increasing the the angle of deflection of said gas stream as the stream progresses along the deflecting surface means.

6. An apparatus for directly measuring stagnation pressure of a gas stream according to claim 5 wherein said deflecting surface means is also smoothly curved in the planes transverse to the flowlines of said deflected gas stream such that a cross section of said deflecting surface means taken in any such plane transverse to the flowlines of the deflected gas stream appears convex when viewed from the side of said surface which deflects the gas.

7. An apparatus for directly measuring stagnation pressure of a gas stream according to claim 6 wherein said curve of said deflecting surface means in the planes transverse to said flowlines of the deflected gas stream closes upon itself such that cross sections of the surface are closed smooth curves.

8. An apparatus for directly measuring stagnation pressure of a gas stream according to claim 5 wherein the width of said deflecting surface means in the direction transverse to the flow of said gas stream is limited to allow the flow of gas off the edges of the deflecting surface means in order to limit the growth of the boundary layer and to prevent separation of said boundary layer.

9. An apparatus for directly measuring stagnation pressure of a gas stream according to claim 5 wherein said deflecting surface means is tapered such that part of said surface farthest forward into the gas stream is the narrowest part of said surface.

10. An apparatus for directly measuring stagnation pressure of a gas stream according to claim 5 wherein said deflecting surface means is comprised of a plurality of curved surface means in a series arrangement progressing downstream each contributing to the deceleration and compression of said part of the gas stream and wherein said pressure measuring means is placed near the down stream end of the last curved surface means.

11. An apparatus for directly measuring stagnation pressure of a gas stream according to claim 5 wherein said pressure measuring means consists of a pitot tube.

12. An apparatus for directly measuring stagnation pressure of a gas stream according to claim 5 wherein said pressure measuring means consists of a Kiel probe.

13. An apparatus for directly measuring stagnation pressure of a gas stream according to claim 5 wherein said deflecting surface means is provided with a plurality of pressure monitoring orifices distributed on the surface such as to sense changes in direction.

14. An apparatus for directly measuring stagnation pressure of a gas stream according to claim 13 wherein said pressure monitoring orifices are alined such that their centers form a line parallel to the flowlines of the deflected gas stream thereby enabling the sensing of the relative orientation of said deflecting surface means in the plane described by the deflected air stream.

15. An apparatus for directly measuring stagnation pressure of a gas stream according to claim 13 wherein said pressure monitoring orifices are aligned such that their centers form a line perpendicular to the flowline of the deflected gas stream thereby enabling the sensing of the relative orientation of said deflecting surface means to the planes transverse to the gas flow.

* * * * *